UNITED STATES PATENT OFFICE.

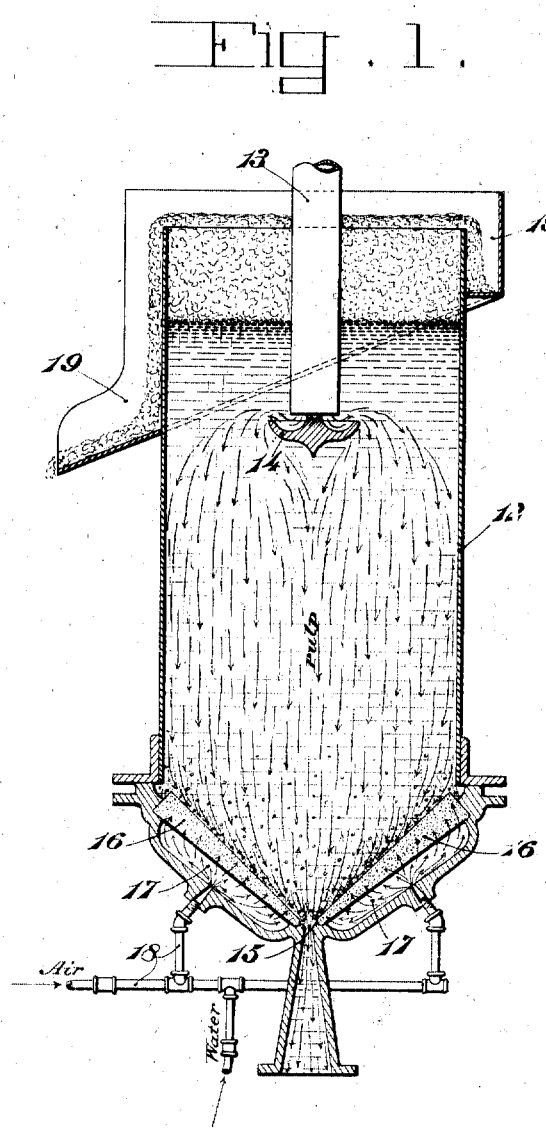

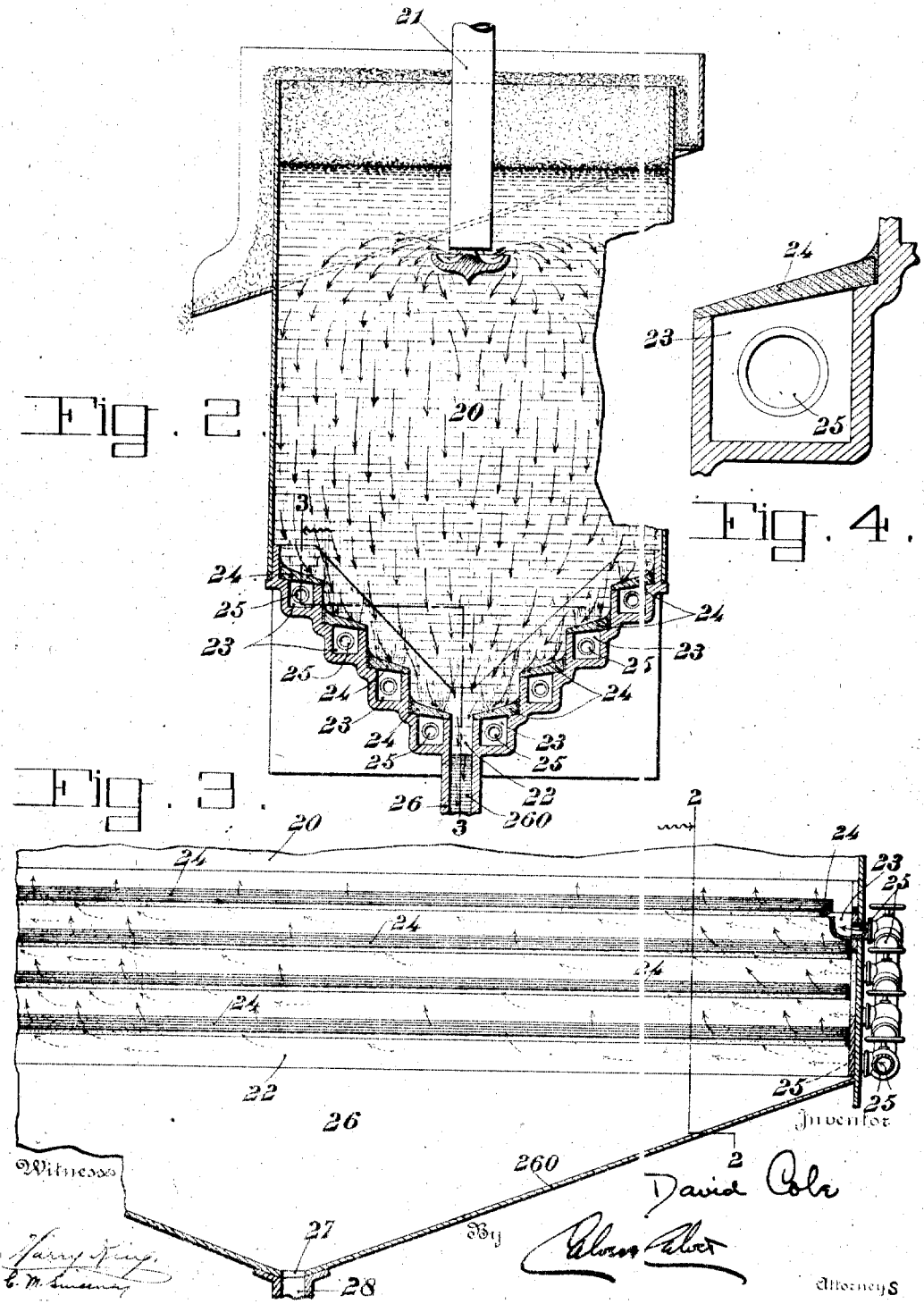

DAVID COLE, OF MORENCI, ARIZONA, ASSIGNOR, BY MESNE ASSIGNMENTS, TO METALS RECOVERY COMPANY, OF AUGUSTA, MAINE, A CORPORATION OF MAINE.

APPARATUS FOR SEPARATING OR CONCENTRATING ORES.

1,223,033.      Specification of Letters Patent.      Patented Apr. 17, 1917.

Application filed August 3, 1915. Serial No. 43,443.

*To all whom it may concern:*

Be it known that I, DAVID COLE, a citizen of the United States, residing at Morenci, in the county of Greenlee and State of Arizona, have invented or discovered certain new and useful Improvements in Apparatus for Separating or Concentrating Ores, of which the following is a specification, reference being had therein to the accompanying drawings.

This invention relates to hydraulic classification, separation, and concentration of ores and the like by what is known as the flotation method and more particularly to that process known as frothing classification. In accordance with the last-named process the material to be separated or classified, in a suitably reduced or comminuted condition, together with a suitable amount of water and usually also with certain other materials, such as oils, acids and the like, forming what is known as "pulp," is introduced into a suitable tank into the lower part of which air in a finely divided state is admitted through a suitable porous or perforated medium. Said air passes through the tank in the form of numerous streams of fine bubbles, carrying with them the finer particles of the ore or other material, and forming a froth in the upper portion of said tank, which froth, together with said finer particles, is discharged at the top of the tank, the coarser particles finding their way to the bottom of the tank and being withdrawn therefrom. The process is usually carried on continuously, the pulp flowing into the tank at a suitable rate, the froth with its content of finer material being continuously discharged at the top, and the water and coarser material being continuously discharged at the bottom of the tank.

In the practice of this process with the apparatus usually employed two sources of difficulty are encountered. In the first place the outlet at the bottom of the tank must usually be of relatively small area in order to provide a sufficient area of porous medium to permit the proper aeration of the liquid, and material passing to and out of the relatively small opening must pass therethrough at a relatively high velocity and tends to form a vortex, the effect of which is to suck down and carry away the bubbles, all of which, in order to secure proper operation, should be allowed to pass freely upwardly through the liquid in the tank. In the second place the coarser material tends to settle upon the porous medium, thereby obstructing the admission of air. The present invention has for its objects to overcome the above difficulties and to provide a frothing classifier which will permit the thorough and even aeration of the liquid without clogging the porous medium by sediment accumulating thereon, and which, at the same time, provides for the efficient withdrawal of the liquid and coarser material with a minimum tendency to interfere with the free upward passage of the bubbles.

The foregoing and other objects of the invention, together with means whereby the same may be carried into effect, will best be understood from the following description of certain forms or embodiments thereof illustrated in the accompanying drawings. It will be understood, however, that the constructions described and shown have been chosen for illustrative purposes merely and that the invention, as defined by the claims hereunto appended, may be otherwise practised without departing from the spirit and scope thereof.

In said drawings:

Figure 1 is a vertical section of a simple form of apparatus embodying the invention.

Fig. 2 is a similar view of another form of apparatus, taken on the line 2—2, Fig. 3.

Fig. 3 is a fragmentary section on the line 3—3, Fig. 2.

Fig. 4 is an enlarged detail sectional view of one of the air chambers shown in Fig. 2 and associated parts.

Referring first to Fig. 1, 12 denotes a tank of any suitable form or size into which the pulp is discharged through a feed pipe 13 preferably provided with a deflector 14 which causes the stream to be broken up and spread out into a thin sheet in order to prevent the formation of violent currents in the tank. Said tank 12 is provided at its bottom with an outlet or discharge opening in the form of a slot 15 extending across substantially the entire bottom of said tank. Adjacent the slot 15 is a pair of inclined and downwardly converging plates 16 composed of porous material such, for example, as carborundum, said plates forming the bottom of the tank and also constituting walls of air chambers 17 into which compressed air is admitted through pipes 18, The air from the chambers 17 passes through the porous plates 16 and upwardly through the liquid in the tank 12 in the form of numerous streams of fine bubbles which carry with them the finer particles of material in the pulp and form in the upper part of said tank a bubble or froth column which overflows into a launder 19 arranged to discharge the froth with its content of fine material at any suitable point. The water, together with the coarser material, gravitates to the bottom of the tank 12 and is discharged through the slot 15.

It will be seen that the outlet 15 is located at a somewhat lower level than that at which the greater portion of the air is introduced into the tank, so that the tendency for the bubbles to be drawn downwardly into the outlet is very slight. Moreover the elongated slot which constitutes the outlet 15 is of a sufficient area to provide for a slow, gentle and even downward passage of the water without the formation of a vortex, so that the tendency for the downward current to overcome the upward movement of the bubbles is further minimized. Furthermore by the inclined arrangement of the plates 16 collection of sediment on these plates and consequent clogging of the air orifices is prevented.

On account, however, of the inclined arrangement of the plates 16, resulting in a difference in elevation of different parts thereof, and a consequent difference of hydrostatic pressure at different points, there would be a tendency, were these plates of constant thickness throughout, for the air to pass through said plates in greatest quantities at points of least hydrostatic pressure, namely, at the upper edges of the plates. To compensate for this and provide for even aeration of the liquid by causing the air to pass through said plates in equal volume from top to bottom, said plates are formed slightly tapering or wedge-shaped in cross-section, with their thickest portions at the top, the difference in thickness between the upper and lower edges being just sufficient to compensate for or balance the difference in hydrostatic pressure, so that the air passes through said plates with equal facility and in equal quantities throughout their area.

In the apparatus shown in Figs. 2 to 4, as in that above described, the tank 20 is provided at its top with a feed pipe 21, and at its bottom with an outlet slot 22 extending substantially completely thereacross. Said bottom comprises two sections converging downwardly to the slot 22, each of said sections being provided with a series of elongated air chambers or tubes 23 arranged in stepped relationship to one another and having closed under sides. The top of each of the chambers 23 is formed by a porous plate 24, said plates being preferably inclined, as shown, in the general direction of the inclination of the corresponding bottom section. Said plates 24 are made slightly wedge-shaped in cross section to compensate for difference in hydrostatic pressure, due to their inclination, so as to cause air to pass through them in equal volumes throughout their area, as heretofore explained. Compressed air is admitted to each of the chambers 23 through a pipe 25, the air pressure in the several chambers of each series being successively greater from top to bottom of the series in order to compensate for difference in hydrostatic pressure due to difference in elevation of the several chambers, so as to provide for an even and thorough aeration of the liquid in the tank.

The stepped arrangement of the porous plates, and also the inclined position of each of said plates, prevents any considerable accumulation of sediment on said plates tending to interfere with the proper passage of air therethrough. Moreover, as in the apparatus first described, it will be seen that the outlet slot 22 is located at a lower level than that at which the air is introduced into the tank, and is of a form to provide for a slow, gentle and even downward passage of water without the formation of a vortex, so that the tendency for the downward current to overcome the upward movement of the bubbles is very slight.

Below the slot 22 the ends of the outlet member 26 converge downwardly, as indicated at 260, forming a hopper having in its bottom a restricted discharge opening 27 communicating with a discharge pipe 28 adapted to convey the tailing to any desired point. By this construction it will be seen that the downward flow of material through the slot 22 is retarded, thereby further minimizing the tendency to suck the bubbles downwardly.

Having thus described my invention I claim and desire to secure by Letters Patent:—

1. In a frothing classifier, a tank, and a porous medium through which air is admitted to said tank, said porous medium being arranged with different portions thereof at different levels and being of different thicknesses at the several levels respectively.

2. In a frothing classifier, a tank and means for admitting air to said tank, said means comprising a series of air chambers arranged at different levels and having tops composed of porous plates arranged with different portions thereof at different levels and of different thicknesses at the several levels respectively, and means for supplying air to the several chambers at different pressures, respectively.

3. In a frothing classifier, a tank and an inclined wedge-shaped porous plate through which air is admitted to said tank.

4. In a frothing classifier, a tank and means for admitting air to said tank, said means comprising a series of air chambers arranged at different levels and having tops composed of inclined wedge-shaped porous plates, and means for supplying air to the several chambers at different pressures, respectively.

5. In a frothing classifier, a tank having a bottom provided with an elongated slot extending thereacross and means for admitting air to said tank in the form of bubbles at different levels above the level of said slot, said means being constructed and arranged to cause the admission of air in constant volume at all levels.

6. In a frothing classifier, a tank having an inclined bottom and an air chamber beneath said bottom, said bottom comprising a porous medium of different thickness at different depths.

7. In a frothing classifier, a tank having a bottom comprising two downwardly converging sections and means for admitting air to said tank through said sections.

8. In a frothing classifier, a tank having a bottom comprising two downwardly converging sections including inclined wedge-shaped porous plates through which air is admitted to said tank.

9. In a frothing classifier, a tank having a bottom comprising two downwardly converging sections and having an elongated slot extending thereacross between said sections, and means for admitting air to said tank through said sections.

10. In a frothing classifier, a tank having a bottom comprising two downwardly converging sections including porous media, and air chambers beneath said sections from which air is admitted to said tank through said porous media.

11. In an ore concentrating apparatus of the flotation type, a trough-shaped, solution-containing tank having inclined sides, a porous body therein spaced from each side to form an air chamber adjacent to each side, said porous body decreasing in thickness from top to bottom, and means for admitting a fluid under pressure into said chambers, said porous body adapted to disseminate the fluid and deliver same in numerous fine bubbles into the solution contained in the tank to cause agitation and frothing of same.

In testimony whereof I affix my signature.

DAVID COLE.